3 Sheets
Sheet No. 3.

J. P. T. DAVIS.
Excavator.

No. 118,793.　　　　Patented Sep. 12, 1871.

ns,793

UNITED STATES PATENT OFFICE.

JOHN P. T. DAVIS, OF NEW TRENTON, INDIANA, ASSIGNOR TO HIMSELF AND SAMUEL DAVIS, OF SAME PLACE.

IMPROVEMENT IN EXCAVATORS.

Specification forming part of Letters Patent No. 118,793, dated September 12, 1871; antedated September 11, 1871.

*To all whom it may concern:*

Be it known that I, JOHN P. T. DAVIS, of New Trenton, in the county of Franklin and State of Indiana, have invented a certain new and useful Improvement in Excavators; and I do hereby declare the following to be a full, clear, and exact description thereof, reference being had to the accompanying drawings forming a part of the same, and in which—

Figure 1:
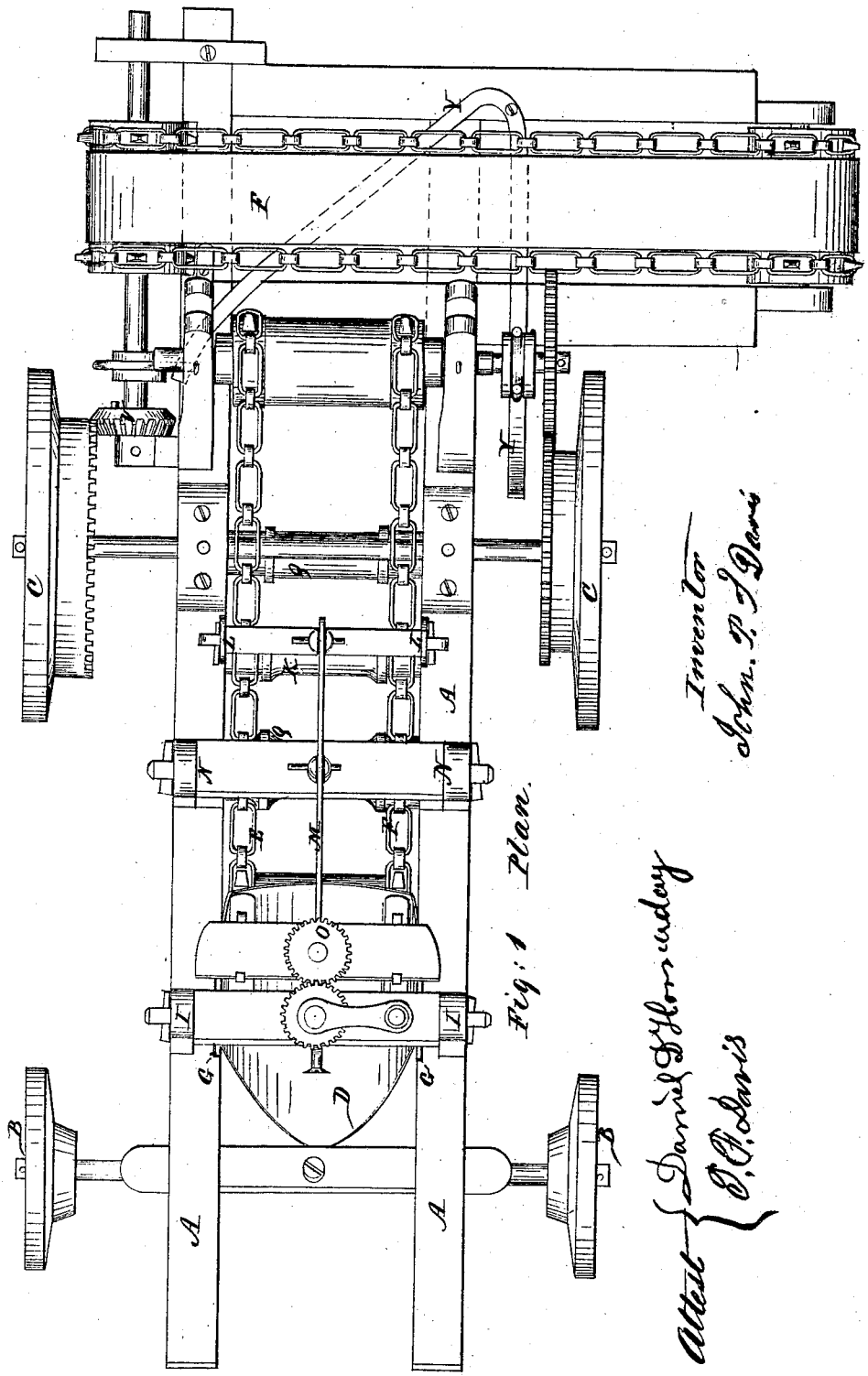
Figure 2:
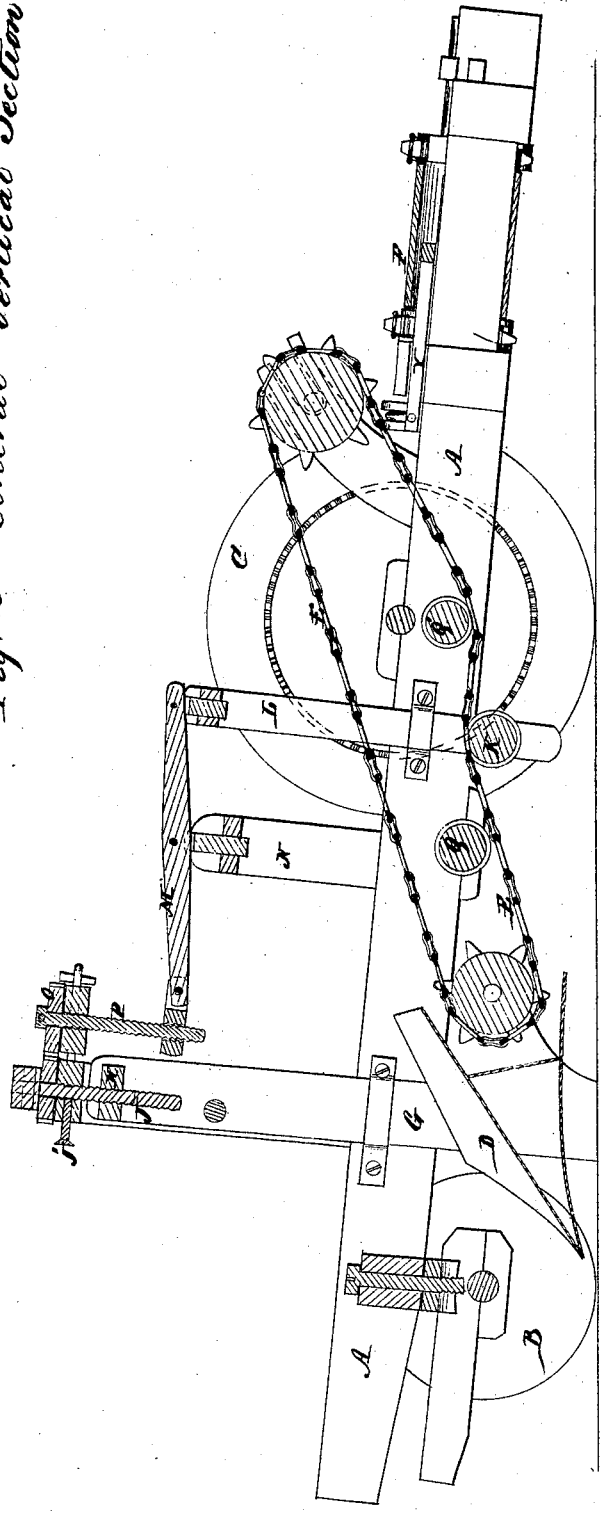
Figure 3:
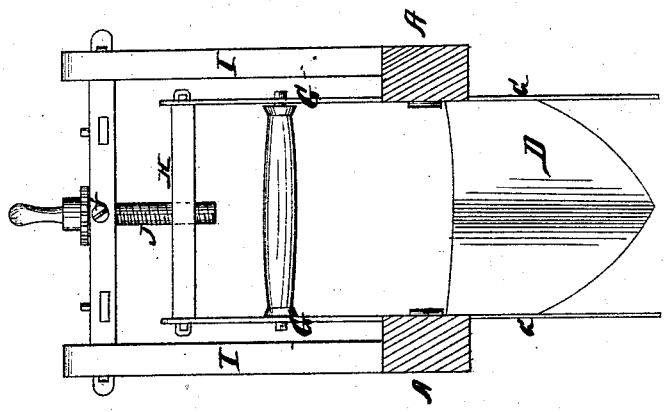

Figure 1 represents a plan view of my improved excavator; Fig. 2, a vertical central section thereof; and Fig. 3 represents a front elevation of the same, partly in section.

This invention relates to excavators; and consists of certain devices, in combination with the cutter or excavator, by means of which said cutter is raised or lowered, adapting it to the depth to which it is desired to cut the ditch or excavation, and allowing it to be thrown up out of the way when not in use; and of devices by means of which the apron or endless belt conveying the dirt from the shovel or cutter is tightened or loosened, as hereinafter set forth.

To enable those skilled in the art to which my invention relates to make and use the same, I will proceed to describe its construction and operation.

In the annexed drawings, A A designates a frame of ordinary construction, suitably mounted upon axles having the wheels B B C C, and furnished with the rollers Q Q' located therein, as shown in Fig. 2. The roller Q has its bearings in boxes secured to the lower sides of the longitudinal bars of the frame A A, with its axis in the same plane as the top of the roller K; and the roller Q' has its bearings in apertures cut in the longitudinal bars of said frame, at points about half way between the upper and lower sides thereof, and placed at a short distance from the roller Q, and with its lower surface in a plane with (or nearly so) the upper surface of the roller Q. The object of these rollers is to assist in tightening the belt or carrier E E as the lever L with the roller K is elevated. D is the shovel or cutter, constructed as shown in the drawings, and secured to and between the colters G G, said colters being elongated or constructed with long shanks which slide vertically within guides or staples secured to frame A A, and between uprights I I mortised into said frame and held together by a transverse bar and keys. (See Fig. 3.) The colters G G are held and connected together by a cross-bar, H. J designates a vertical screw, which is supplied at its upper end with a crank for operating it, and a pinion or cog, and passes down through the cross-bar of uprights I I and cross-bar H of the colters G G, to which colters it imparts vertical movement when operated, thereby allowing said colters to be raised or lowered in order that they may be adapted to the depth to which it is desired to cut the ditch to be made, or elevated when not in use. The screw J is firmly held in place, when the cutter and colters have been set, at the desired point by means of set screw *j*. P designates another vertical screw, the object of which will be seen hereafter; and it is provided at its upper extremity with a cog or pinion, *o*, gearing with the pinion of screw J, from which it derives motion, and it passes through a bar attached by suitable means, as seen in Fig. 1, to the transverse piece of the uprights I I and through a short pivoted arm of the lever M. The fulcrum of the lever M, which is at its center, consists of a pin, which has its bearings in the bifurcated end of a small post located and secured in the center of the transverse piece of the uprights N secured to frame A A. The rear end of the horizontal lever M is pivoted to a recessed post secured to and in the center of the transverse bar of the vertically-sliding uprights or bars L L. L L are two sliding bars connected with the lever M, as above stated, confined to the frame A A by means of staples or guides screwed thereto, and supplied at their lower ends with apertures which form bearings for the axle of the roller K. E E designate two chain-belts, embracing and receiving the teeth upon cylinders or rollers located, one upon a shaft having its bearings in apertures in the colters G G, and the other upon a shaft having its bearings in curved uprights secured to the rear end of the frame A A. Between these chain-belts, and enveloping the rollers just referred to, is designed to be used an endless apron for conveying the dirt from the shovel D, taken up by the latter, to the apron F. To the axle of the rear toothed roller of the belts E E is attached a pinion gearing with another pinion located on the axle of one of the driving-wheels, C, for communicating motion to said roller, giving in turn motion to its belts and apron. The shaft of said roller is provided also with a clutch, which is operated by a shifting V-shaped bar, Y, for throwing its pinion in and out of gear with the pinion of the rear driving-wheels. The apron F passes around rollers similar to the rollers of belts E E, which have their bearings in a frame attached to and placed at right-angles with the frame A A, with the desired inclination for assisting in delivering the dirt (which it receives from the apron taking the dirt from the shovel D) therefrom. The axle of the upper one of the rollers of the apron F is provided with a beveled pinion, which gears with the inner toothed rim of one of the rear driving-wheels C of frame A A. This axle is also provided with a clutch for engaging its pinion with or disengaging it from the said driving-wheel. The bar Y also operates this clutch, and is pivoted at its center or apex to the frame of the apron F. The object of the lever M, screw P, and sliding bars or uprights L L carrying the roller K, is to tighten or loosen, as the case may require, the belts and apron E E, as, when the said screw is revolved in one direction it will depress that end of the lever M into which it fits, and elevate the opposite end of said lever, which will in turn elevate the sliding-bars L L and roller K, bringing said roller up against the belts E E and apron, thus tightening the latter; and when revolved in the opposite direction have the contrary effect upon the said lever, said sliding-bars and said roller consequently slackening or loosening the said belts and apron. As the screws J and P are revolved they have opposite effects, the former raising the colters G G and shovel D, while the latter is depressing its end of the lever M, producing the result above stated; and while the latter is raising its end of said lever the former will be depressing the said colters and shovel, both of the said screws being operated by the same mechanism. Thus it will be seen from the above that the shovel or plow, and the belts and apron for taking the dirt from said plow, can be simultaneously adjusted for use, and likewise, when not in use, the said plow elevated and the said belts and apron loosened.

Having thus described my invention, what I claim and desire to secure by Letters Patent, is—

1. The shovel D and colters G G connected together by a transverse piece, H, and movable vertically within guides and between uprights I I, in combination with the screw J, with gearing and crank, and set screw j, all constructed and operating substantially as and for the purpose described.

2. The screw P, lever M, uprights N, sliding bars L L, and roller K, in combination with the rollers Q Q', arranged and operating substantially as and for the purpose set forth.

3. The screws J and P, in combination with the colters G G, and plow D, lever M, sliding bars L L, and rollers K and Q Q', all operating substantially as and for the purpose set forth.

JOHN P. T. DAVIS.

Witnesses:
   T. F. CHAPPELOW,
   JOHN P. CASE.